United States Patent
Dew

[15] 3,644,254
[45] Feb. 22, 1972

[54] COATING COMPOSITIONS

[72] Inventor: Jimmy S. Dew, Texas City, Tex.

[73] Assignee: Monsanto Company, St. Louis, Mo.

[22] Filed: May 21, 1968

[21] Appl. No.: 730,928

[52] U.S. Cl. ............... 260/28.5 AV, 260/28.5 A, 260/897 B
[51] Int. Cl. ........................................................ C08f 45/52
[58] Field of Search ........................... 260/28.5 A, 28.5 AV

[56] References Cited

UNITED STATES PATENTS

| | | | |
|---|---|---|---|
| 3,048,553 | 8/1962 | Moss | 260/28.5 AV |
| 3,215,657 | 11/1965 | Beresniewicz | 260/28.5 AV |
| 3,338,856 | 8/1967 | Arabian | 260/28.5 AV |
| 3,355,405 | 11/1967 | Tyran | 260/28.5 AV |
| 3,407,162 | 10/1968 | Rundle | 260/28.5 AV |
| 3,503,914 | 3/1970 | Tyran | 260/28.5 AV |
| 3,146,214 | 8/1964 | Jakaitis | 260/28.5 AV |

*Primary Examiner*—Morris Liebman
*Assistant Examiner*—P. R. Michl
*Attorney*—Elizabeth F. Sporar, M. N. Cheairs and H. B. Roberts

[57] ABSTRACT

Heat-sealable compositions containing ethylene-vinyl acetate copolymers, petroleum wax, and at least one polyethylene resin, and a process for their preparation.

4 Claims, No Drawings

COATING COMPOSITIONS

BACKGROUND OF THE INVENTION

The present invention relates to heat-sealable compositions suitable for coating processes and, more particularly, to compositions containing ethylene-vinyl acetate copolymers, a petroleum wax and at least one polyethylene resin.

Compositions containing various amounts of ethylene-vinyl acetate copolymers in admixture with petroleum wax are known to be useful in coating paper, cloth, fibers and food products such as cheese. When used in the latter application, it is necessary that the coating heat seal at a temperature low enough so that the food product is not degraded by excessive heat. While some blends of ethylene-vinyl acetate copolymers and wax show acceptable minimum heat-seal temperatures, they suffer from certain other disadvantages such as poor processability on extrusion coating equipment.

SUMMARY

It has now been found that compositions having low minimum heat-sealing temperatures and excellent processability on extrusion coating equipment can be obtained by blending a petroleum wax with an ethylene-vinyl acetate copolymer, and a free-radical-produced, branched polyethylene. In a particularly preferred embodiment of the present invention, the compositions also contain a small amount of a linear polyethylene.

The novel heat-sealable blends comprise by weight from 5 to 30 percent and preferably 15 to 25 percent of a petroleum wax, from 40 to 90 percent and preferably 50 to 70 percent of an ethylene-vinyl acetate copolymer and from 5 to 30 percent and preferably 15 to 25 percent of a free-radical-produced branched polyethylene containing at least 98 percent ethylene. An especially desirable composition is obtained by incorporating along with the above components from 1 to 10 percent and preferably 2 to 7 percent by weight of a linear polyethylene. When the compositions contain the linear polyethylene component, the branched polyethylene is present in an amount from 4 to 20 percent and preferably 13 to 18 percent by weight.

The present invention also contemplates a process for the preparation of the above blends by first melting together the polymeric products and then incorporating the petroleum wax to form a homogeneous product.

DESCRIPTION OF THE PREFERRED EMBODIMENT

The ethylene-vinyl acetate copolymers useful in the present invention can be obtained by methods which are well known in the art. Generally, these copolymers are prepared by subjecting the monomers to pressures ranging from 5,000 p.s.i.g. to above 60,000 p.s.i.g. and temperatures from about 100° to 400° C. in the presence of a free-radical initiator as a catalyst. Suitable catalysts include molecular oxygen, peroxygen type compounds, alkyl peroxides, diperoxy dicarbonate esters, tert-alkyl percarboxylates, persulfates, peracids, azo-type compounds, oximes, etc. The ethylene-vinyl acetate copolymers useful in the present invention should contain from about 15 to 30 percent vinyl acetate and from 70 to 85 percent ethylene by weight, the copolymers containing from 15 to 25 percent vinyl acetate (and correspondingly 75 to 85 percent ethylene) being especially preferred. In general, the ethylene-vinyl acetate copolymers can have melt indexes ranging from 1.5 to 15 g./10 minutes.

The term "petroleum wax" as used herein refers to both paraffin and microcrystalline waxes. Paraffin waxes, which are preferred for use in this invention, are a mixture of solid hydrocarbons derived from the overhead wax distillation fraction obtained from the fractional distillation of petroleum. After purification, the paraffin waxes contain hydrocarbons that fall within the formula range of $C_{23}H_{43}$–$C_{35}H_{72}$. Paraffin waxes are generally colorless, hard and translucent, having a melting point range from 125° to 165° F. The paraffin waxes preferred for use in the present invention have melting points ranging from 150° to 160° F. Microcrystalline waxes are obtained from the nondistillable still residues from the fractional distillation of petroleum. They differ from paraffin waxes in containing branched hydrocarbons of higher molecular weights. They are more plastic than paraffin waxes and generally have melting points of 150° to 200° F.

The free-radical-produced branched polyethylene used in the present invention can be obtained by processes as described above for the production of ethylene-vinyl acetate copolymers. The branched polyethylene should contain at least 98 percent by weight ethylene and may contain up to 2 percent of certain modifiers used in the polymerization processes. Such modifiers include alkanes such as propane, ketones such as acetone, and aldehydes such as propionaldehyde. Generally, the branched polyethylene will have a melt index of from 0.05 to 2.0 g./10 minutes and more preferably from 0.2 to 1.0 g./10 minutes. While the densities of the branched polyethylene can vary from 0.916 to 0.926 g./cc., it is especially preferred that the density be 0.918 to 0.922 g./cc.

An especially preferred composition is obtained by adding a small amount of a linear polyethylene having a density of greater than 0.945 g./cc. and preferably from about 0.950 to about 0.960 g./cc. The "high density" linear polyethylene which can have a melt index ranging from 0.05 to 2.0 g./10 minutes may be prepared by techniques well known in the art such as, for example, by polymerization in the presence of a Ziegler catalyst or by the so-called Phillips process wherein a chromium oxide catalyst is employed. The linear polyethylene may contain minor amounts of other polymerizable monomers such as alpha-olefins, and it is particularly useful to employ a linear polyethylene containing from 0.01 to 0.50 percent by weight of butene-1.

In preparing the compositions of the present invention, it has been found that the manner of blending is critical if one is to obtain homogeneous blends. Accordingly, there is provided a process for preparing a heat-sealable coating composition comprising melting together by heating to a temperature of from about 120° to about 140° C., an ethylene-vinyl acetate copolymer and a free-radical-produced branched polyethylene to produce a polymeric melt, maintaining with agitation said polymeric melt at said temperature for a period of from 2 to 60 minutes, adding to said polymeric melt a petroleum wax and agitating said wax and polymeric melt for a period of from 2 to 60 minutes. When it is desired to prepare the preferred blend of the present invention containing a small amount of a linear polyethylene, the latter component is melted together with the ethylene-vinyl acetate copolymer and the branched polyethylene, and the wax is then added as outlined above. As noted above, this order of blending of the components is critical inasmuch as if the wax is first melted and then it is attempted to incorporate the polymer components into the molten wax, an inhomogeneous product is obtained which is not suitable for coating purposes. The blending process of the present invention is best accomplished in a Banbury mixer, or other similar mixing device.

The invention is illustrated by the following example which is not to be construed as a limitation on the scope thereof. All percentages given are by weight unless otherwise indicated.

EXAMPLE

A series of blends of various ethylene-vinyl acetate copolymers, wax and several polyethylene resins were prepared by first melting together the polymeric components and maintaining the melt at a temperature of 135° C. for three minutes in a Banbury mixer. The petroleum wax was then added and the temperature again brought to 135° C. and held at that level for about 8 to 10 minutes while the wax and polymer components were agitated. The blends were cooled and dropped from the mixer. In all cases, the free-radical-produced, branched polyethylene had a density of 0.920 g./cc. with a melt index of 0.3 g./10 minutes. The petroleum wax used was a commercially available paraffin wax having a melting point of 154° F. AMP and a molecular weight of 338. The blends were extrusion-coated on Kraft paper using a 1-inch Killion extruder. The die-to-nip distance was approximately 5 inches with a die width of 6 inches. The table below gives the blend compositions, processing data, minimum heat-seal temperature data, and some of the physical properties of the blends.

TABLE 1

| Ex. No. | Blend composition, percent | | | | Processing data | | | | | | Physical properties | | | | |
|---|---|---|---|---|---|---|---|---|---|---|---|---|---|---|---|
| | Wax | Ethylene-vinyl acetate copolymer | Branched polyethylene | Other | Temperature, °F. | Output, lbs./hr./in. | Neck-in (inches) 50 f.p.m. | 150 f.p.m. | 300 f.p.m. | Maximum Drawdown, f.p.m. | Melt¹ flow g./10 min., 160° C. | Memory percent, 160° C. | Thickness, mils | Heat² seal strength, g./in. | MHST,³ °F. |
| 1 | 30 | ⁴70 | | | 315 | 1.7 | surge | surge | surge | >450 | 60 | 55 | | | |
| 2 | | | ⁵100 | | 600 | 2.1 | 3.8 | 2.8 | 2.2 | >750 | | | 3.1 | 2,250 | 260 |
| 3 | 25 | ⁶50 | 25 | | 400 | 2.2 | 3.9 | 3.9 | 3.6 | 680 | 10 | 88 | 3.4 | 2,400 | 200 |
| 4 | 20 | ⁴50 | 30 | | 405 | 2.2 | 3.9 | 3.9 | | 360 | 7.5 | 78 | 4.3 | 1,800 | 180 |
| 5 | 20 | ⁴55 | 20 | ⁷5 | 309 | 2.2 | 3.8 | 4.0 | 3.9 | 390 | 6.2 | 58 | 3.8 | 2,650 | 155 |
| 6 | 20 | ⁴55 | 25 | | 400 | 2.2 | 4.0 | 4.1 | 3.9 | 420 | 8.5 | 80 | 3.5 | 2,500 | 170 |
| 7 | 25 | ⁴50 | 25 | | 415 | 2.2 | 4.1 | 4.2 | | 500 | 14 | 120 | 4.1 | 2,650 | 170 |
| 8 | 25 | ⁴49 | 25 | ⁸1 | 400 | 2.2 | 4.1 | 4.2 | | 460 | 12 | 110 | 3.5 | 2,550 | 170 |
| 9 | 25 | ⁶50 | 25 | | 305 | 2.1 | 3.6 | 3.5 | | 330 | 10 | 88 | 3.1 | 2,650 | 185 |
| 10 | 20 | ⁴55 | 20 | ⁷5 | 315 | 2.1 | 3.6 | 3.5 | | 240 | 6.2 | 58 | 2.2 | 1,950 | 155 |
| 11 | 20 | ⁴55 | 25 | | 320 | 2.2 | 3.8 | 3.8 | | 250 | 8.5 | 80 | 3.3 | 2,450 | 165 |
| 12 | 20 | ⁴50 | 30 | | 315 | 2.3 | 3.8 | 3.9 | | 190 | 7.5 | 78 | 3.3 | 2,300 | 170 |
| 13 | 25 | ⁴50 | 25 | | 325 | 2.2 | 3.9 | 3.9 | | 270 | 14 | 120 | 3.5 | 2,250 | 165 |
| 14 | 25 | ⁴49 | 25 | ⁸1 | 325 | 2.2 | 3.8 | 3.6 | | 280 | 12 | 110 | 3.1 | 1,550 | 165 |

¹ As per ASTM D-1238-65T, condition C, except temperature of 160° C. used rather than 150° C.
² Obtained on a Type 272 Amthor Tester manufactured by Amthor Testing Instrument Company.
³ Minimum heat-seal temperature. This is the minimum temperature at which the maximum heat-seal strength is obtained on a 1-mil coating. The substrate for the coating was Kraft.
⁴ 28% vinyl acetate, 72% ethylene. Melt index=6 g./10 minutes.
⁵ Typical branched polyethylene coating resin. Density=0.916 g./cc. Melt index=10 g./10 minutes.
⁶ 20% vinyl acetate, 80% ethylene. Melt index=3 g./10 minutes.
⁷ Linear polyethylene containing 0.015 weight percent butene-1. Density=0.955 g./cc. Melt index=0.2 g./10 minutes.
⁸ 0.96% Ca(OH)₂ and 0.04% 2,6-di-tert-butyl catechol.

A comparison of the data in Run 1 with those in Runs 3–14 clearly establishes that the compositions of the present invention have markedly superior processability as compared to ethylene-vinyl acetate copolymers. It can also be seen by comparing Run 2 with Runs 3–14, that the blends of the present invention show a minimum heat-seal temperature at least 50° F. lower than is obtained with a branched polyethylene generally used as a coating resin. The importance of a low minimum heat-seal temperature when a food product is being coated has already been mentioned above. It should be further noted that no minimum heatseal temperature data are given in Run 1 and such, in fact, are unobtainable inasmuch as the blend containing only wax and the ethylene-vinyl acetate copolymer could not be processed.

The data in the table, for example, Runs 8 and 14, show that small amounts of various additives can be incorporated into the blends without any deleterious effect thereon. In fact, these additives may be beneficial at higher processing temperatures. Such additives include antioxidants and other preservatives.

The compositions of the present invention also show high resistance to moisture vapor permeation, which enhances their usefulness in the coating of food products. It is to be understood, however, that the utility of the blends is not restricted to coatings for food products. They may be employed in numerous other coating applications as, for example, preparing coated articles such as milk cartons, waterproofing of fabrics, and moisture proofing of cardboard boxes.

What is claimed is:

1. A heat-sealable composition comprising, by weight,
   15 to 25 percent of a paraffin wax,
   50 to 70 percent of an ethylene-vinyl acetate copolymer consisting essentially of 15 to 25 percent vinyl acetate,
   4 to 20 percent of a free-radical-produced branched polyethylene containing at least 98 percent ethylene having a melt index from 0.05 to 2.0 g./10 min, and
   1 to 10 percent of a linear polyethylene having a melt index from 0.05 to 2.0 g./10 min.

2. A process for preparing a heat-sealable coating composition comprising
   melting together with heating to a temperature from 120° to 140° C, from 40 percent to 90 percent by weight of an ethylene-vinyl acetate copolymer containing from 15 percent to 30 percent by weight vinyl acetate and from 70 percent to 85 percent by weight ethylene and having a melt index in the range from 1.5 to 15 g./10 min, from 13 to 18 percent by weight of a free-radical-produced branched polyethylene containing at least 98 percent by weight ethylene and having a melt index from 0.05–2.0 g./10 min, and 2 to 7 percent by weight of a linear polyethylene having a melt index from 0.05 to 2.0 g./10 min to form a polymeric melt,
   maintaining with agitation said polymeric melt at said temperature for a period of from 2 to 60 minutes,
   adding to said polymeric melt from 5 to 30 percent by weight of a petroleum wax and agitating said wax and polymeric melt for a period of from 2 to 60 minutes.

3. The composition of claim 1 wherein said linear polyethylene has a density from 0.950 to 0.960 g./cc.

4. The composition of claim 3 wherein said branched polyethylene is present in an amount of from 13 to 18 percent and said linear polyethylene is present in an amount of from 2 to 7 percent.

* * * * *

PO-1050
(5/69)

UNITED STATES PATENT OFFICE
CERTIFICATE OF CORRECTION

Patent No. 3,644,254     Dated February 22, 1972

Inventor(s)     Jimmy S. Dew

It is certified that error appears in the above-identified patent and that said Letters Patent are hereby corrected as shown below:

In Table I, bridging Columns 3 and 4, Run No. 5, the column headed "Temperature, °F", for "309" read -- 390 --.

In Column 3, line 43, for "heatseal" read -- heat-seal --.

Signed and sealed this 18th day of July 1972.

(SEAL)
Attest:

EDWARD M. FLETCHER, JR.     ROBERT GOTTSCHALK
Attesting Officer               Commissioner of Patents